United States Patent
Meda (10) Patent No.: US 11,093,876 B2
(45) Date of Patent: Aug. 17, 2021

(54) SYSTEM AND METHODS EMPLOYED FOR ACCOUNTABILITY OF AN ASSET

(71) Applicant: MARVEL BUSINESS SOLUTIONS PVT LTD, Hyderabad (IN)

(72) Inventor: Ramana Meda, Hyderabad (IN)

(73) Assignee: MARVEL BUSINESS SOLUTIONS PVT LTD, Hyderabad (IN)

(*) Notice: Subject to any disclaimer, the term of this patent is extended or adjusted under 35 U.S.C. 154(b) by 0 days.

(21) Appl. No.: 16/477,906

(22) PCT Filed: Oct. 9, 2018

(86) PCT No.: PCT/IB2018/057793
§ 371 (c)(1),
(2) Date: Jul. 15, 2019

(87) PCT Pub. No.: WO2019/073366
PCT Pub. Date: Apr. 18, 2019

(65) Prior Publication Data
US 2020/0242528 A1 Jul. 30, 2020

(30) Foreign Application Priority Data
Oct. 10, 2017 (IN) .............................. 201741035975

(51) Int. Cl.
*G06Q 10/06* (2012.01)
(52) U.S. Cl.
CPC ... *G06Q 10/06313* (2013.01); *G06Q 10/0633* (2013.01)
(58) Field of Classification Search
CPC ......................................... G06Q 10/00–50/00

USPC ................................................ 705/7.11–7.42
See application file for complete search history.

(56) References Cited

U.S. PATENT DOCUMENTS

| | | | |
|---|---|---|---|
| 8,788,452 B2 * | 7/2014 | Stoneking | G06Q 10/06393 707/603 |
| 2002/0194045 A1 * | 12/2002 | Shay | G06Q 10/06 705/7.14 |
| 2006/0229921 A1 * | 10/2006 | Colbeck | G06Q 10/0637 705/7.22 |
| 2016/0070258 A1 * | 3/2016 | Raviola | G06Q 10/06 700/100 |
| 2017/0249574 A1 * | 8/2017 | Knijnik | G06Q 10/06314 |
| 2020/0125575 A1 * | 4/2020 | Ghoshal | G06K 9/6267 |

OTHER PUBLICATIONS www.meriiam-webster.com/dictionary/valid (Year: 2020).*

* cited by examiner

*Primary Examiner* — Alan S Miller
(74) *Attorney, Agent, or Firm* — Marvel Business Solutions PVT Ltd (57) ABSTRACT

Exemplary embodiments of the present disclosure are directed towards a system and method for an accountability of an asset. A computing device 104 initiates work order, an asset management module 108 consists of an intelligent module 206 to perform work order segmentation and perform outline analysis and an accountability engine 110 processes aspects associated with assets received from the asset management module 108 based on initiated work order. The accountability engine 110 creates rankings or ratings for the assets against accountability parameters in a trust engine 112 and suggest appropriate assets to the intelligent module 206 in the asset management module 108.

14 Claims, 10 Drawing Sheets

SYSTEM AND METHODS EMPLOYED FOR ACCOUNTABILITY OF AN ASSET

TECHNICAL FIELD

The disclosed subject matter relates generally to enterprise systems and related methods for management of accountability of assets. More particularly, the present disclosure relates to the system and method for suggesting and generating accountability of assets.

BACKGROUND

In today's dynamic business environment, enterprises are facing more complex employment conditions that require better and more granular control and/or flexibility of their management of assets. Whether they are businesses, non-profit organizations, or government agencies, every enterprise grapples with the accountability of assets. The accountability of assets includes, but is not limited to, quality, deadline, relationship, confidentiality, audit-ready, productivity, budgets, efficiency, performance, and profitability. The definition of the asset includes, but is not limited to resources, employees, vendors, outside persons, stakeholders, clients, records, reports, and the like. Definition of the resource includes, but is not limited to Hardware, Software, Infrastructure, and Intellectual property, etc. Defining a measure of accountability parameter for each task is difficult and inexact. A measure is a complex synergy of related (specified) and unrelated (unspecified) indicators. Reliable methods to track asset's accountability is largely nonexistent. For example, in order to provide an accountability for a resource (for e.g., employees and vendors, outside persons, stakeholders, and the like), as well as to adjust critical processes, the enterprises have long sought an effective measure to judge the resource skill and performance.

Currently some enterprise resource planning (ERP) and project management solutions available in the market do not capture the accountability of the individual assets performing the tasks and activities. There are multiple measures for an asset like productivity, quality, etc. Measures are usually looked at from a singularity or a relationship standpoint in an accountability measurement system. The limitations associated with the conventional accountability systems and methods, is that, they lack self-learning and further do not include the accountability of an asset from the various metrics that are generated during the asset lifecycle and beyond. The available solutions are not providing suitable solutions to complete the task and activity in a given time period without effecting the bottom line and bringing accountability to assets.

In the light of the aforementioned discussion, there exists a need for a certain system with a novel methodology that would overcome the above-mentioned limitations.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In an embodiment of the present disclosure, a system and method for suggesting and generating accountability of an asset is provided.

In another embodiment of the present disclosure, an accountability engine driven by artificial intelligence further integrates with an accountri system, a trust engine and data analytics is provided. The accountri system further comprises an infrastructure, hardware, software, work order, resources, skills, quality control, hiring, clients, vendors, information security controls, and the like.

In another embodiment of the present disclosure, the accountability engine is configured to play around with indicators in the trust engine and suggest appropriate assets to an intelligent module in the accountri system.

In another embodiment of the present disclosure, the system comprising a computing device configured to establish two-way wireless-communications with an accountability of asset suggesting and generating system over a network.

In another embodiment of the present disclosure, the accountability of asset suggesting and generating system comprising at least one asset management module comprises computer-executable instructions, that when executed, instruct the at least one computing device to initiate a work order, at least one end user initiates and submits the work order to the at least one asset management module via the at least one computing device.

In another embodiment of the present disclosure, at least one asset management module comprising a plurality of aspects associated with a plurality of assets, the at least one asset management module comprising an intelligent module, whereby the at least one intelligent module is configured to perform the work order segmentation and perform an outline analysis.

In another embodiment of the present disclosure, at least one accountability engine is configured to process the plurality of aspects associated with the plurality of assets received from the at least one asset management module based on the initiated work order, the at least one accountability engine is configured to segregate the plurality of assets into a plurality of valid assets and a plurality of invalid assets, the at least one accountability engine is configured to create a plurality of rankings or ratings for the plurality of assets against a plurality of accountability parameters in a trust engine and suggest appropriate assets to the intelligent module in the at least one asset management module.

BRIEF DESCRIPTION OF THE DRAWINGS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

FIG. 1 is a diagram depicting an exemplary environment in which various embodiments disclosed herein may be implemented. Specifically, FIG. 1 depicts a schematic representation of an environment.

DETAILED DESCRIPTION OF EXAMPLE EMBODIMENTS

It is to be understood that the present disclosure is not limited in its application to the details of construction and the arrangement of components set forth in the following description or illustrated in the annexed drawings. The present disclosure is capable of other embodiments and of being practiced or of being carried out in various ways. Also, it is to be understood that the phraseology and terminology used herein is for the purpose of description and should not be regarded as limiting. The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first", "second", and "third", and the like, herein do not denote any order, quantity, or importance, but rather are used to distinguish one element from another.

Figure 1:
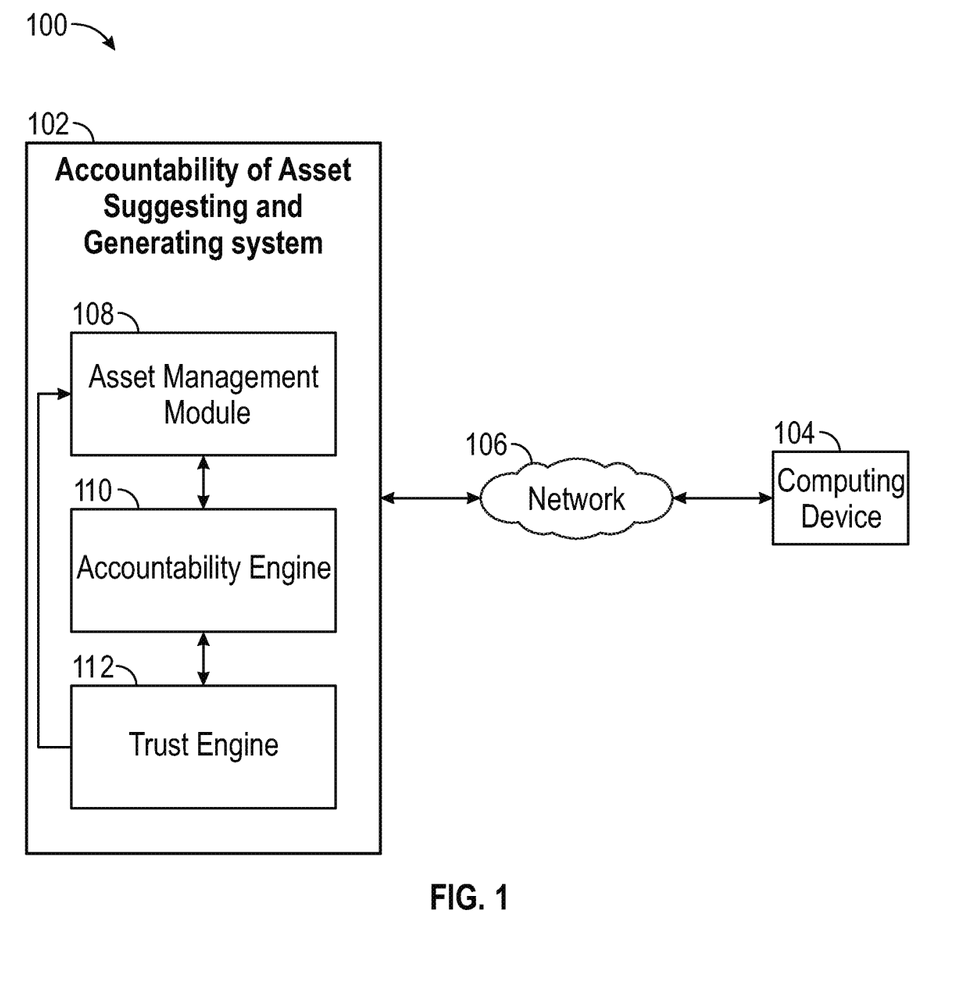

Referring now to the drawings wherein like numerals represent like elements throughout the several figures, FIG. 1 is a diagram depicting an exemplary environment 100 in which various embodiments disclosed herein may be implemented. Specifically, FIG. 1 depicts a schematic representation of environment 100. The environment 100 depicting an accountability of asset suggesting and generating system 102 connected to a computing device 104 through a network 106. The accountability of asset suggesting and generating system 102 may include an asset management module 108, an accountability engine 110, and a trust engine 112. The accountability engine 110 and the trust engine 112 may include, but are not limited to, computing devices, and the like. The network 106 may include, but is not limited to, an ethernet, a wireless local area network (WLAN), or a wide area network (WAN), a WIFI, Nil communication network e.g., the wireless high speed internet, or a combination of networks, a cellular service such as a 4G (e.g., LTE, mobile WiMAX), NFL or 5G cellular data service and beyond. The network 106 may provide a web interface/mobile interface employing a transmission control protocol, hypertext transfer protocol, simple object access protocol or any other internet communication protocol. The network 106 may provide application programming interface or integration services. The computing device 104 represents a device such as personal computer, handheld device, internet enabled calling device, workstation, electronic book reader, personal digital assistant, mobile station, mobile phones, computing tablets, and the like. When the computing device 104 corresponds to mobile devices (e.g., mobile phones, tablets etc.), and the applications (for e.g., the accountability of asset suggesting and generating system 102) are mobile applications (for e.g., android applications, IOS applications, windows applications, and open & closed environment), software that offers the functionality of accessing mobile applications, and viewing/processing of interactive pages, for example, is implemented in the computing devices 104, as will be apparent to one skilled in the relevant arts by reading the disclosure provided herein.

The asset management module 108 may comprise aspects associated with assets. The assets may include a work order, resources, skills, quality control, hiring, clients, vendors, information security controls, infrastructure, hardware, software, records, reports, inputs, outputs, and so forth. The assets may be influenced by influence aspects of other assets. The influence aspects may be rated or ranked by the accountability engine 110 and the influence aspects may have sub-aspects. The influence aspect rating (the rating may be positive, for e.g.) may involve other assets (buddy assets, for e.g.). The accountability engine 110 may be configured to pull the aspects into itself from asset management module 108 and/or other modules.

The trust engine 112 may be configured to rank or rate the assets against the accountability parameters. The accountability parameters may include, but are not limited to, quality, deadline, relationship, and confidentiality, audit-ready, productivity, efficiency, cost, performance, profitability, and so forth. Each accountability parameter may include measures like cost, defects, production, skill, and so forth. For an example, the asset management module 108 is configured to assign the resources to work order based on the skill and accountability rating. The work order is initiated by an end user (client, for example) directly. The resources are assigned to the deliverables. Each work order has one or more tasks and each task has one or more deliverables. At the time of resource assignment, the asset management module 108 may get the feed from the accountability engine 110. The accountability engine 110 may suggest the resources required to complete the task and who may have appropriate accountability. The resources having a shift off or maintenance may not be shown. The resources over-allocated may be shown with a warning legend.

The trust engine 112 may be configured to rank or rate the asset with minimum allocation unit (not shown). The allocation units (not shown) may be fed to the accountability engine 110. In a Human Resource Management example, an asset may be mapped to the skill and productivity. The asset skill may be updated based on the training taken and the test result. Skill may also change based on the quality control feedback given for a particular work order. Each deliverable of work order may have multiple skills associated with it. The accountability engine 110 may suggest the skills required to perform the task based on learning from previous tasks performed through the intelligent module (not shown). In an example, skills would be added to the master skill list of the organization if selected for a particular deliverable. The skill may be tagged to resources and measured based on the test results or task performance.

Quality issues for a particular work order or any ad-hoc quality issues of any resource may be tracked and fed to the trust engine 112. Accountability of the resource goes down if the quality goes down even if the deadline or productivity is met. The asset, such as hiring may be done through the standard process against any task requirement. The accountability engine 110 may be configured to suggest suitable profiles available outside organization based on the work order requirement. The asset, such as clients may place and track work orders. The documents may be shared among customer's staff, clients and vendors. The asset, such as audits and documents may be shared between the vendor and company staff. The asset, such as information security control asset includes policies, change request, incidents may be tracked and submitted to the audit module and to the accountability engine 110. The asset, such as infrastructure asset may be shared asset across multiple organizations or shared across multiple resources within the organization. The infrastructure may include multiple hardware and software devices and/or units. In an example, the infrastructure may include, but not limited to, airport, railway station, bus station, and so forth. The asset, such as hardware asset may be the resource used for maintaining the infrastructure and may be used or helpful for delivering the output of a service or work order. The asset, such as software may be the resource used for creating, improving or to maintain the hardware. The software may be typically a logical instruction list for the hardware to perform.

Figure 2:
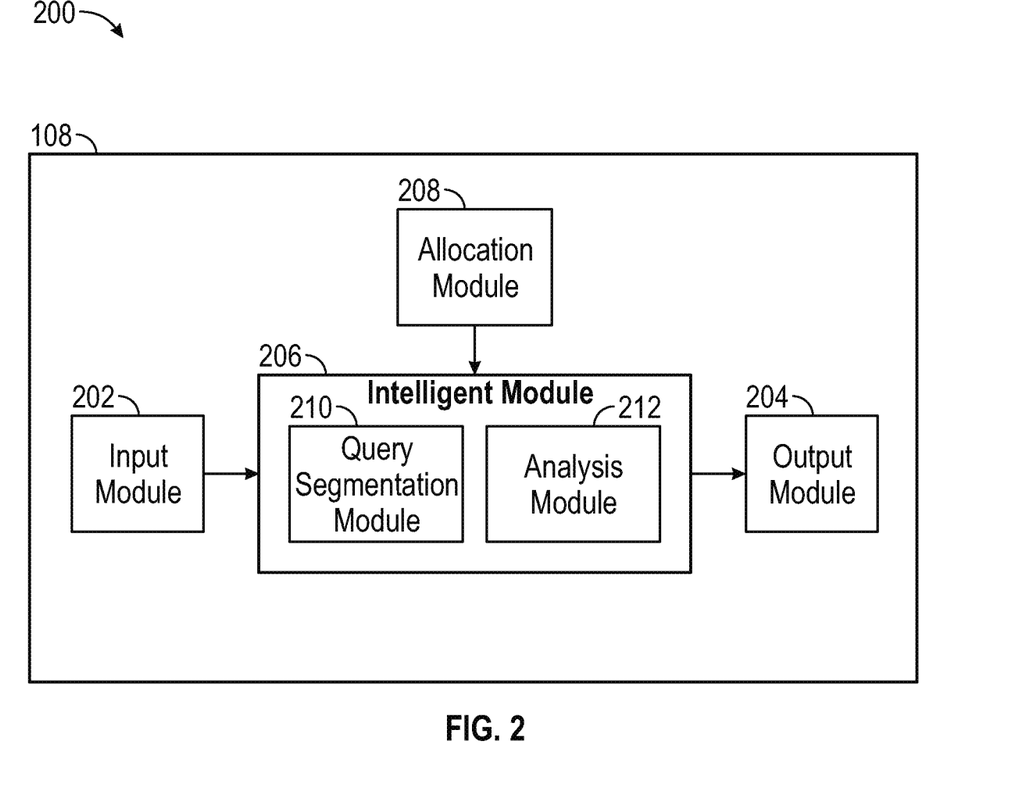
FIG. 2 is a block diagram depicting the asset management module 108 shown in FIG. 1, in accordance with one or more exemplary embodiments.

Referring to FIG. 2 is a block diagram 200 depicting the asset management module 108 shown in FIG. 1, in accordance with one or more exemplary embodiments. The asset management module 108 further depicting an input module 202, an output module 204, an intelligent module 206, and an allocation module 208. The input module may be configured to accept the list of assets to be managed and also accepts the design aspect and process aspect for each asset. The output module 204 may be configured for outputting the results of assets to the accountability engine 110 and the trust engine 112. The intelligent module 206 may be configured to move the approved assets into the trust engine 112. The intelligent module 206 may include a segmentation module 210, and an analysis module 212. The segmentation module 210 may be configured to perform the work order segmentation and may realize the possibility of not able to handle the work order or may initiate the process. If the process is initiated the accountability engine 110 may perform the commit. The analysis module 212 may be configured to perform the outline analysis that this asset has performed predetermined units (45 units per hour, for e.g.) in a remote scenario. The allocation module 208 may be configured to allocate the list of assets to the accountability engine 110.

Figure 3:
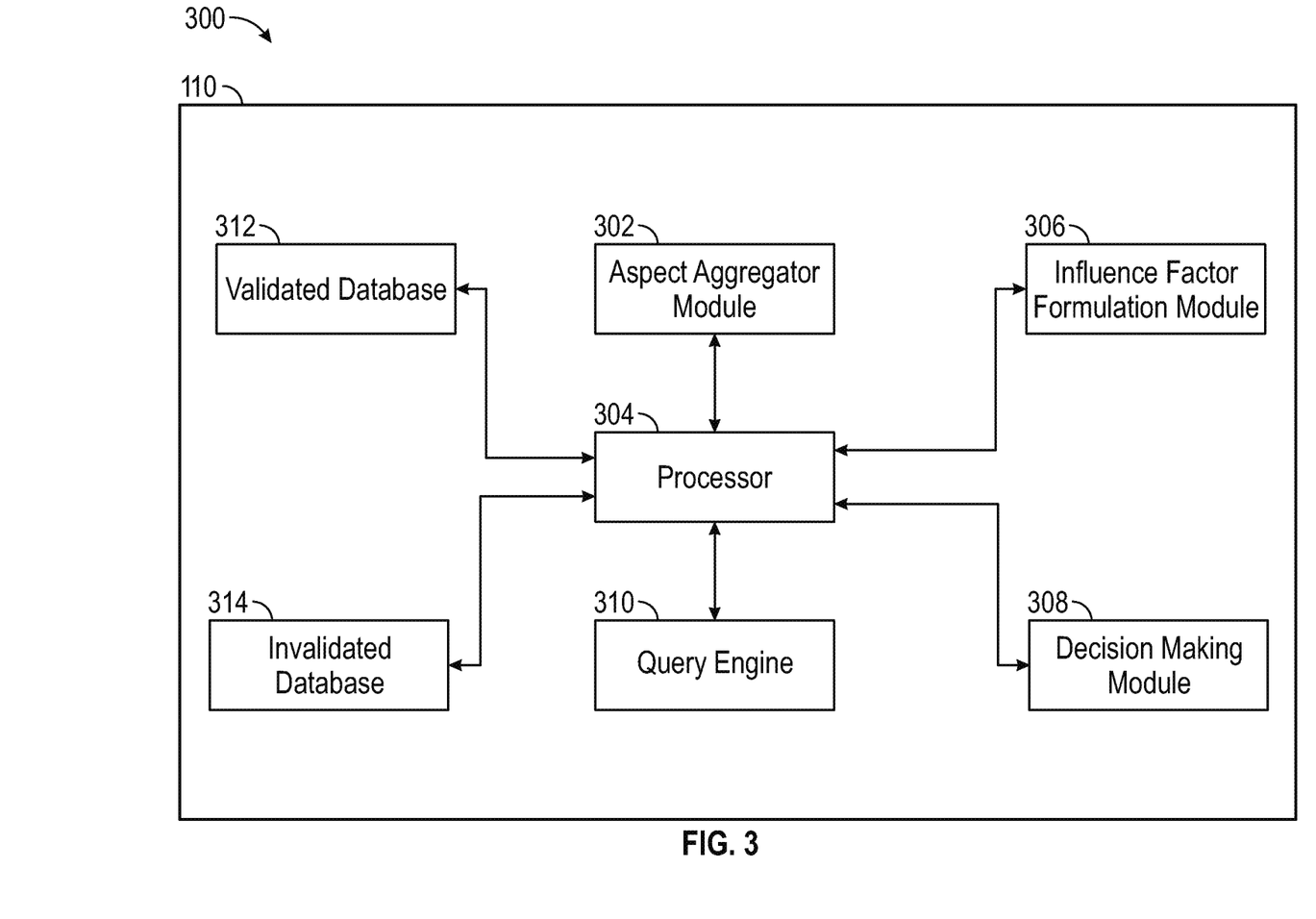
FIG. 3 is an example block diagram depicting the accountability engine 110 shown in FIG. 1, in accordance with one or more exemplary embodiments.

Referring to FIG. 3 is an example block diagram 300 depicting the accountability engine 110 shown in FIG. 1, in accordance with one or more exemplary embodiments. The accountability engine 110 may be configured to analyze the accountability parameters. The accountability engine 110 may include an aspect aggregator module 302, a processor 304, an influence factor formulation module 306, a decision-making module 308, a query engine 310, a validated database 312, and an invalidated database 314. The aspect aggregator module 302 may be a gateway into the accountability engine 110 for various modules to push data for the consumption of the accountability engine 110. For the aspect aggregator module 302 to work, every module attached to it may have a placeholder in the validated database 312 and the invalidated database 314 for capturing relevant aspect associated with the assets. For example, special columns to capture all the assets, aspect rating data. If the module doesn't have the database placeholder, custom adapters may be written to capture the required data at for a given module.

The aspect aggregator module 302 may be configured to write schedules, which may be configured based on the need and requirement of sampling data. The aspect captured may include an asset to aspect rating, as the asset to aspect rating under the influence of one or more assets. The aspect aggregator module 302 may be configured to automatically or periodically pull all the aspects into itself. The processor 304 may be configured to take all the aspects gathered by the aspect aggregator module 302 and may create various rankings for different assets based on the aspects of the assets. The configuration (processor configuration, for e.g.) may be required to inform the processor 304 when to run, where to pull the data from and where to store the processed data. The processor 304 may also be configured to process the newly received data and create a rating or ranking for each aspect. The processor 304 may communicate with the influence factor formulation module 306 to learn about the rating of the assets in the context of other assets. For example, a project "X" may be ranked lower than a project "Y" so whatever the values that various assets get in the context of project "X" may be adjusted accordingly. Based on the inputs from the influence factor formulation module 306, the data may be updated to the trust engine 112. The update to the trust engine 112 may be done in one go, so that the previous data may be backed up, in case of any mistakes that may happen at the influence factor formulation module 306. The processor 304 may be configured to process the data and may segregate the results into valid assets and invalid assets. The valid assets may end up in the trust engine 112. The processor 304 may be configured to provide the update to the trust engine 112 after processing the new assets and comparing the new assets with the existing assets.

The influence factor formulation module 306 may be configured to provide the inputs to the processor 304. The influence factor formulation module 306 may have rules engine to mention the comparative or rating based data to each asset. For example, high rating project, highly rated resource, highly rated machine, and so forth. The influence factor formulation module 306 may include various influencing factors on the aspects, it may consult both validated and/or invalidated data sets to formulate few influence factors. The influence factor formulation module 306 may be used by the processor 304 to process the aspects for storage. The influence factor formulation module 306 may be a self-learning module and it keeps improving itself all the time.

The decision-making module 308 may act as an alternative to the trust engine 112. The decision-making module 308 may comprise non-validated assets as well for any suggestions. The decision-making module 308 may be the final authority for finalizing the decision for either storing it in the trust engine 112 or proposing to the intelligent module 206 for approval to move the approved assets into the trust engine 112. The decision-making module 308 may be consulted by the intelligent module 206 to get suggestions for a given work order.

Figure 4:
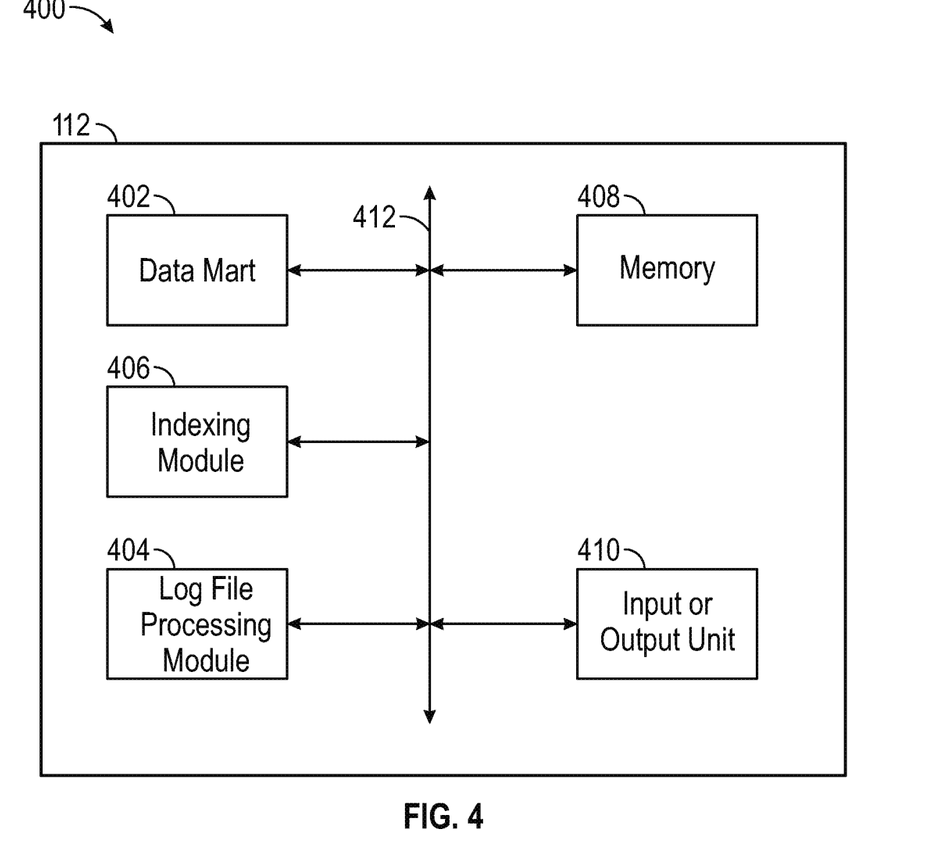
FIG. 4 is a diagram depicting the trust engine 112 shown in FIG. 1, in accordance with one or more exemplary embodiments.

Referring to FIG. 4 is a diagram depicting the trust engine 112 shown in FIG. 1, in accordance with one or more exemplary embodiments. The trust engine 112 may further include a data mart 402, a log file processing module 404, an indexing module 406, and a memory 408, an input or output unit 410, and a bus 412. The bus 412 may include a path that permits communication among the components of the trust engine 112. The data mart 402 is dynamically built for the assets that are stored in databases. The measures of the assets may have validated (committed, for e.g.) and in-validated indicators. The data mart 402 may include databases, which may not be limited to, staging databases, and the like. The data mart 402 may be configured to store the indicators for all the measures of assets. The log file processing module 404 may be configured to maintain all change records. For example, the log file processing module 404 stores the data change and an associated time for the data change. The indexing module 406 may be configured to hold log files, application programming interfaces, and any physical files. The memory 408 may be configured to index the assets with foremost measures. The input or output unit 410 may be configured to send and receive data to the asset management module 108, and the accountability engine 110. In-validated indicators may be committed only when they are validated. The accountability engine 110 may be configured to perform validation.

Figure 5:
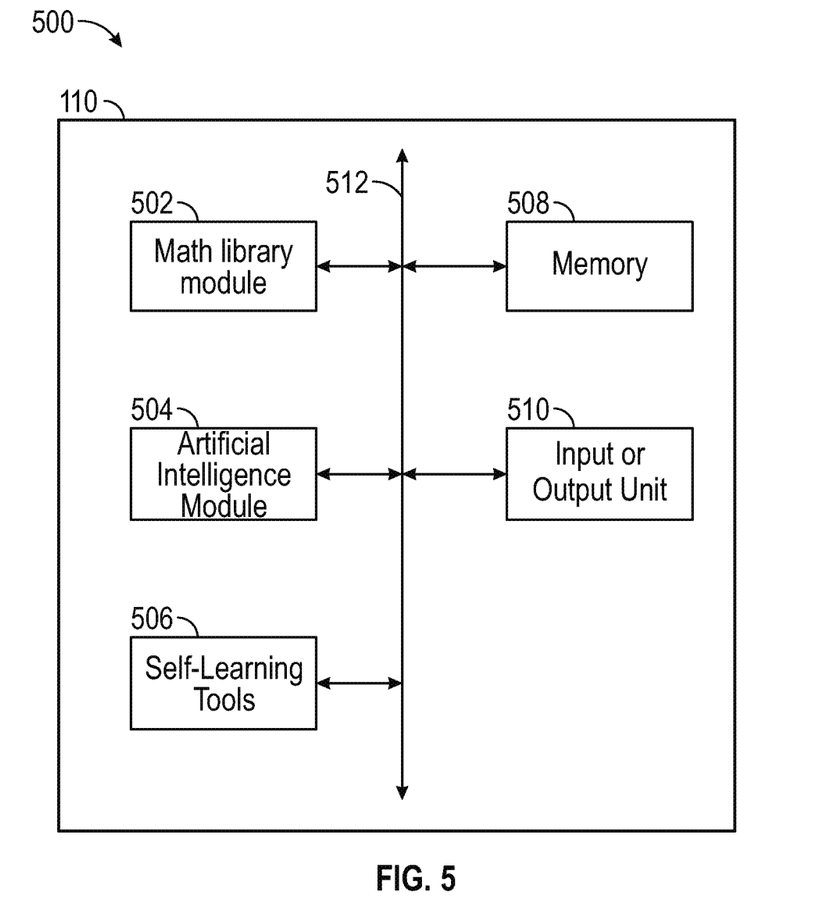
FIG. 5 is an example diagram depicting the accountability engine 110 shown in FIG. 1, in accordance with one or more exemplary embodiments.

Referring to FIG. 5 is an example diagram 500 depicting the accountability engine 110 shown in FIG. 1, in accordance with one or more exemplary embodiments. The accountability engine 110 may be configured to propose the resources and the assets required to perform the task. The accountability engine 110 may include a math library module 502, an artificial intelligence module 504, self-learning tools 506, and the memory 508, and the input or output unit 510, and the bus 512. The bus 512 may include a path that permits communication among the components of the accountability engine 110.

The accountability engine 110 may be configured to validate indicators based on overall system approach. Based on the work order specification and measures required, the accountability engine 110 may be configured to play around with indicators in the trust engine 112 and suggest appropriate assets to the intelligent module 206 in the asset management module 108. The math library 502 may be configured to carry out various processes and generate results based on the requests from the user. The artificial intelligence algorithms 504 may be configured to process the user inputs, analyze and assist response to the user with answer to the queries. The self-learning tools 506 may be configured for adaptive collective learning and decision making.

Example use case: a customer may have a work order with the following requirements: 20% defects accepted per lot, production need is 1000 pieces, lot size is 10 pieces, efficiency needed is 70%, and confidentiality maintained is 99%. The accountability engine 110 may suggest the assets required to perform the task and with the required production quantity. In the absence of accountability engine 110, the intelligent module 206 may suggest top 10 indexed assets from the trust engine 112 or suggested resources based on a particular measure for example skill.

Another Example use case: The average productivity requirement may be 55 units/hour. In an example, there is only one asset available to perform the task and whose productivity is 20 units/hour in accordance with the validated data. The accountability engine 110 may have found based on outline analysis that this asset has performed 45 units/hour in a remote scenario. The accountability engine 110 may analyze the environment, parameters, and measures under which asset has produced 45 units/hour and it may then suggest the intelligent module 206 in asset management module 108 to provide an environment where the particular asset can produce 55 units/hour. If the intelligent module 206 agrees to the query given to it, the accountability engine 110 then commits the data. The accountability engine 110 may keep proposing new queries and do self-learning until the queries is accepted. Based on the instructions from the accountability engine 110, the intelligent module 206 may perform query segmentation and may realize the possibility of not able to handle the query or may initiate the process. If the process is initiated, accountability engine 110 may perform the commit.

Figure 6:
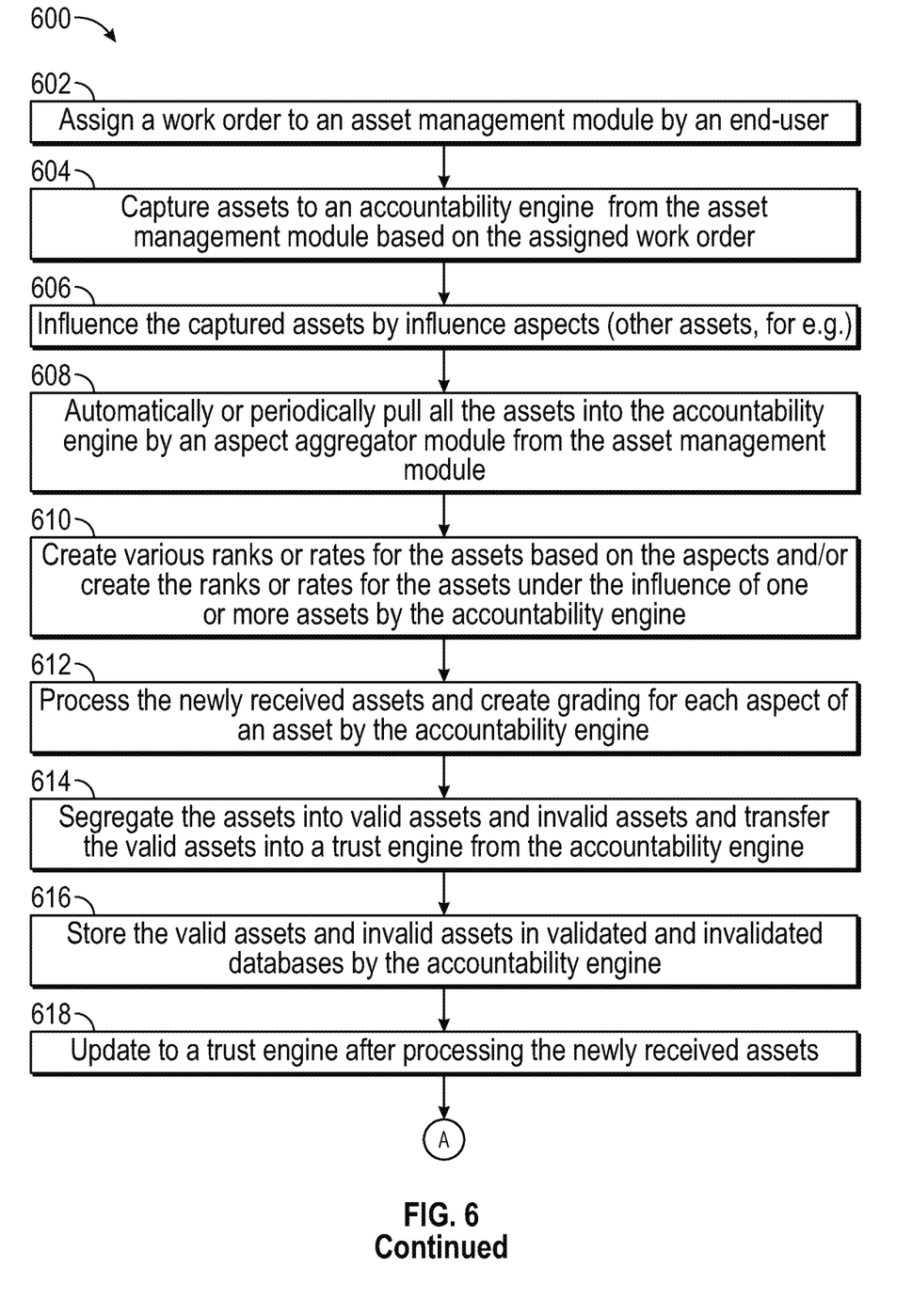
FIG. 6 is a flowchart depicting an exemplary method for suggesting and generating accountability of assets, in accordance with one or more embodiments.

Referring FIG. 6 is a flowchart 600 depicting an exemplary method for suggesting and generating accountability of assets, in accordance with one or more embodiments. As an option, the method 600 is carried out in the context of the details of FIG. 1, FIG. 2, FIG. 3, FIG. 4, and FIG. 5. However, the method 600 is carried out in any desired environment. Further, the aforementioned definitions are equally applicable to the description below.

The method commences at step 602, where the work order is assigned to the asset management module by the end user. The end user may include, but is not limited to, a client, a manager, an employee within the organization, a team lead, and the like. Thereafter, at step 604, the accountability engine captures the assets from the asset management module based on the assigned work order. Thereafter, at step 606, the assets are influenced by the influence aspects (other assets, for e.g.). Thereafter, at step 608, the aspect aggregator module automatically or periodically pulls all the assets into the accountability engine from the asset management module. Thereafter, at step 610, the accountability engine creates various ranks or rates for the assets based on the aspects and/or creates the ranks or rates for the assets under the influence of one or more assets. Thereafter, at step 612, the accountability engine processes the newly received assets and creates ranks or rates for each aspect of an asset. Thereafter, at step 614, the accountability engine segregates the assets into valid assets and invalid assets and transfers the valid assets into the trust engine. Thereafter, at step 616, the accountability engine stores the valid assets and invalid assets in the validated and the invalidated databases respectively. The validated database and the invalidated database may include special columns to capture all the assets.

Thereafter, at step 618, the accountability engine updates to a trust engine after processing the newly received assets. Thereafter, at step 620, the asset management module passes the work order to the accountability engine when the trust engine doesn't fetch any asset. Thereafter, at step 622, the accountability engine finds the appropriate assets from the combination of validated and invalidated databases. Thereafter, at step 624, the accountability engine suggests the assets to complete the work order. Thereafter, at step 626, the asset management module assigns the appropriate assets to the work order based on the suggestions and ranks or rates by the accountability engine.

Figure 7:
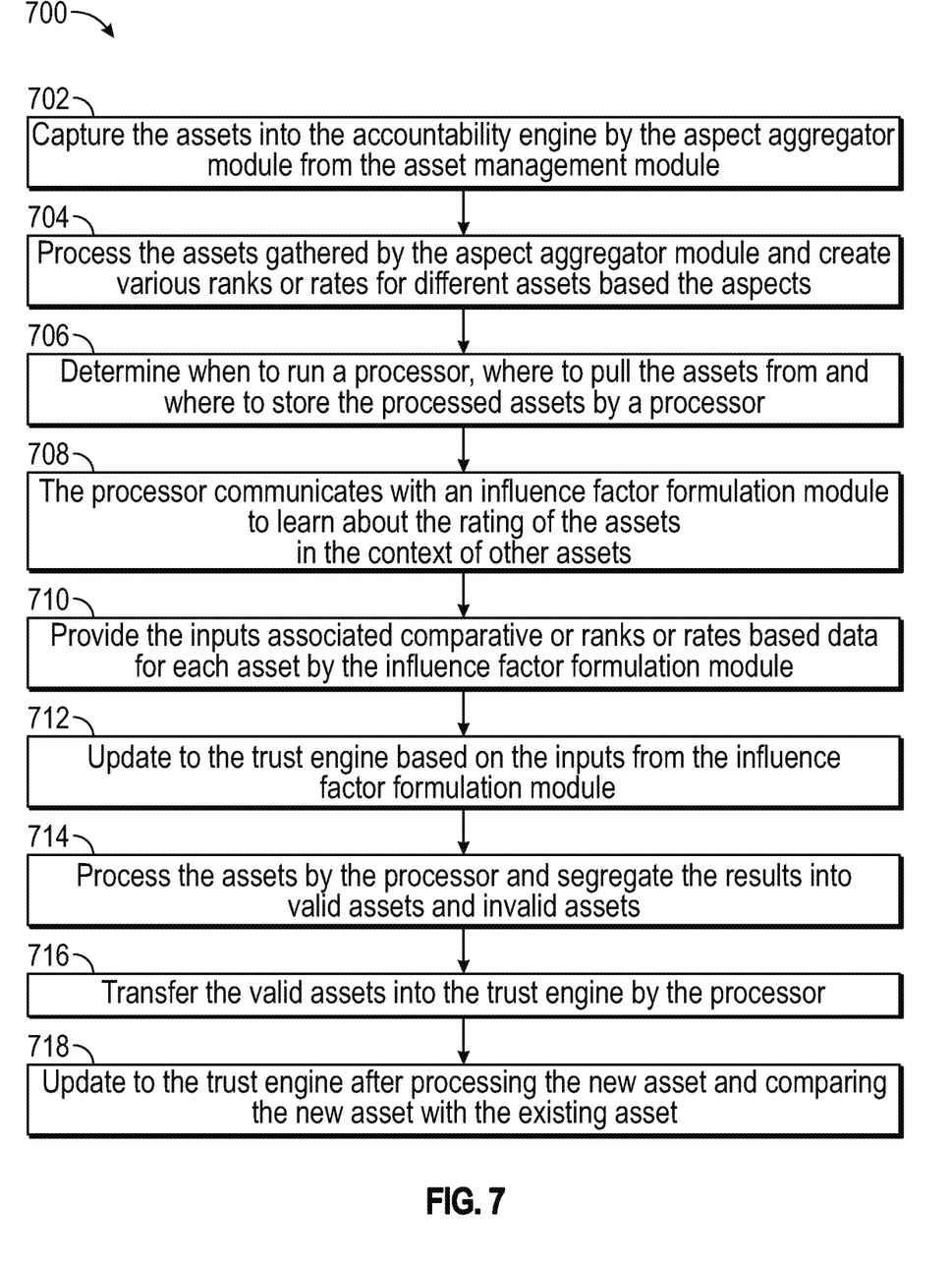
FIG. 7 is a flowchart depicting an exemplary method for generating updates to the trust engine, in accordance with one or more embodiments.

Referring to FIG. 7 is a flowchart 700 depicting an exemplary method for generating updates to the trust engine, in accordance with one or more embodiments. As an option, the method 700 is carried out in the context of the details of FIG. 1, FIG. 2, FIG. 3, FIG. 4, FIG. 5, and FIG. 6. However, the method 700 is carried out in any desired environment. Further, the aforementioned definitions are equally applicable to the description below.

At step 702, the aspect aggregator module captures the assets into the accountability engine from the asset management module. Thereafter, at step 704, the processor processes the assets gathered by the aspect aggregator module and creates various ranks or rates for different assets based on the aspects. Thereafter, at step 706, determines when to run the processor, where to pull the assets from and where to store the processed assets. Thereafter, at step 708, the processor communicates with the influence factor formulation module to learn about the rating of the assets in the context of other assets. Thereafter, at step 710, the influence factor formulation module provides the inputs associated comparative or rank or rate based data for each asset. Thereafter, at step 712, the processor updates to the trust engine based on the inputs from the influence factor formulation module. Thereafter, at step 714, the processor processes the assets and segregates the results into valid assets and invalid assets. Thereafter, at step 716, the processor transfers the valid assets into the trust engine. Thereafter, at step 718, the processor updates to the trust engine after processing the new asset and comparing the new asset with the existing asset.

Figure 8:
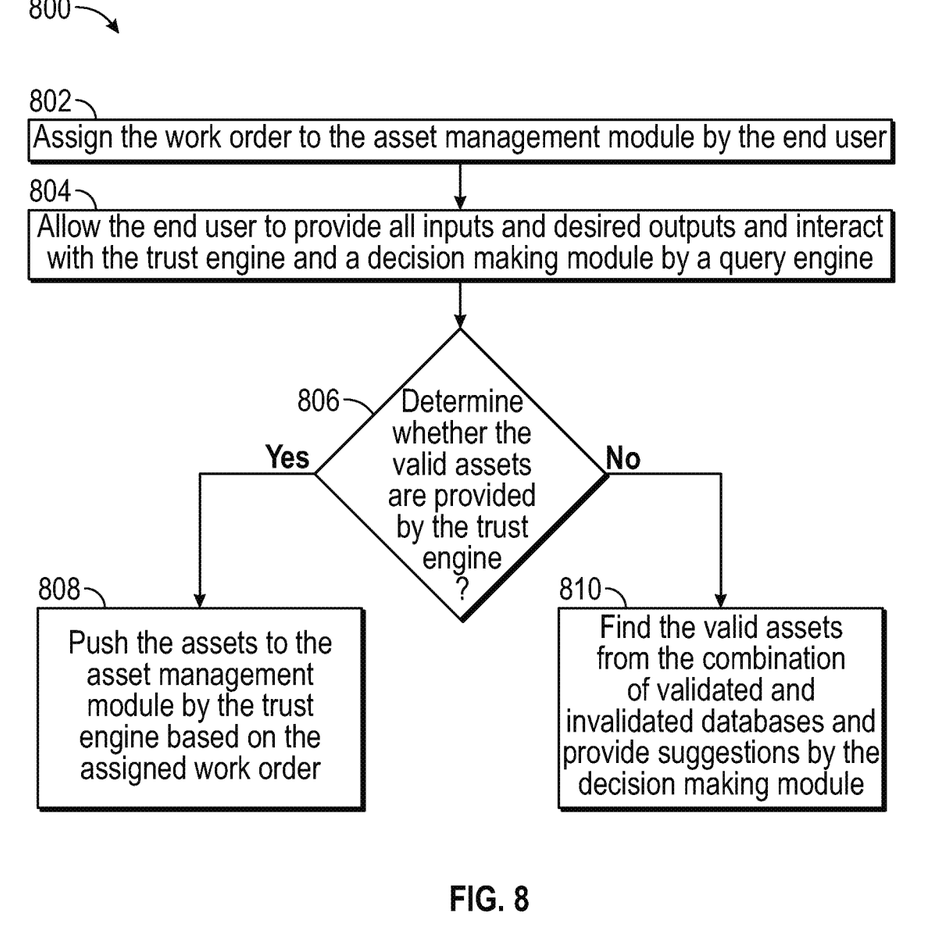
FIG. 8 is a flowchart depicting an exemplary method for suggesting assets by the decision-making module, in accordance with one or more embodiments.

Referring FIG. 8 is a flowchart 800 depicting an exemplary method for suggesting assets by the decision-making module, in accordance with one or more embodiments. As an option, the method 800 is carried out in the context of the details of FIG. 1, FIG. 2, FIG. 3, FIG. 4, FIG. 5, FIG. 6, and FIG. 7. However, the method 800 is carried out in any desired environment. Further, the aforementioned definitions are equally applicable to the description below.

At step 802, the end user assigns the work order to the asset management module. The work order may include one or more tasks and each task may have one or more deliverables. Thereafter, at step 804, the query engine is operable to allow the end user to provide all inputs and desired outputs and interact with the trust engine and the decision-making module. Thereafter, at step 806, the trust engine determines whether the valid assets are provided to the end user. If the answer to the step 806 is YES, then the exemplary method continues at step 808, pushes the assets to the asset management module by the trust engine based on the assigned work order. If the answer to the step 806 is NO, then the exemplary method continues at step 810, finds the valid assets from the combination of validated and invalidated databases and provides suggestions by the decision-making module.

Figure 9:
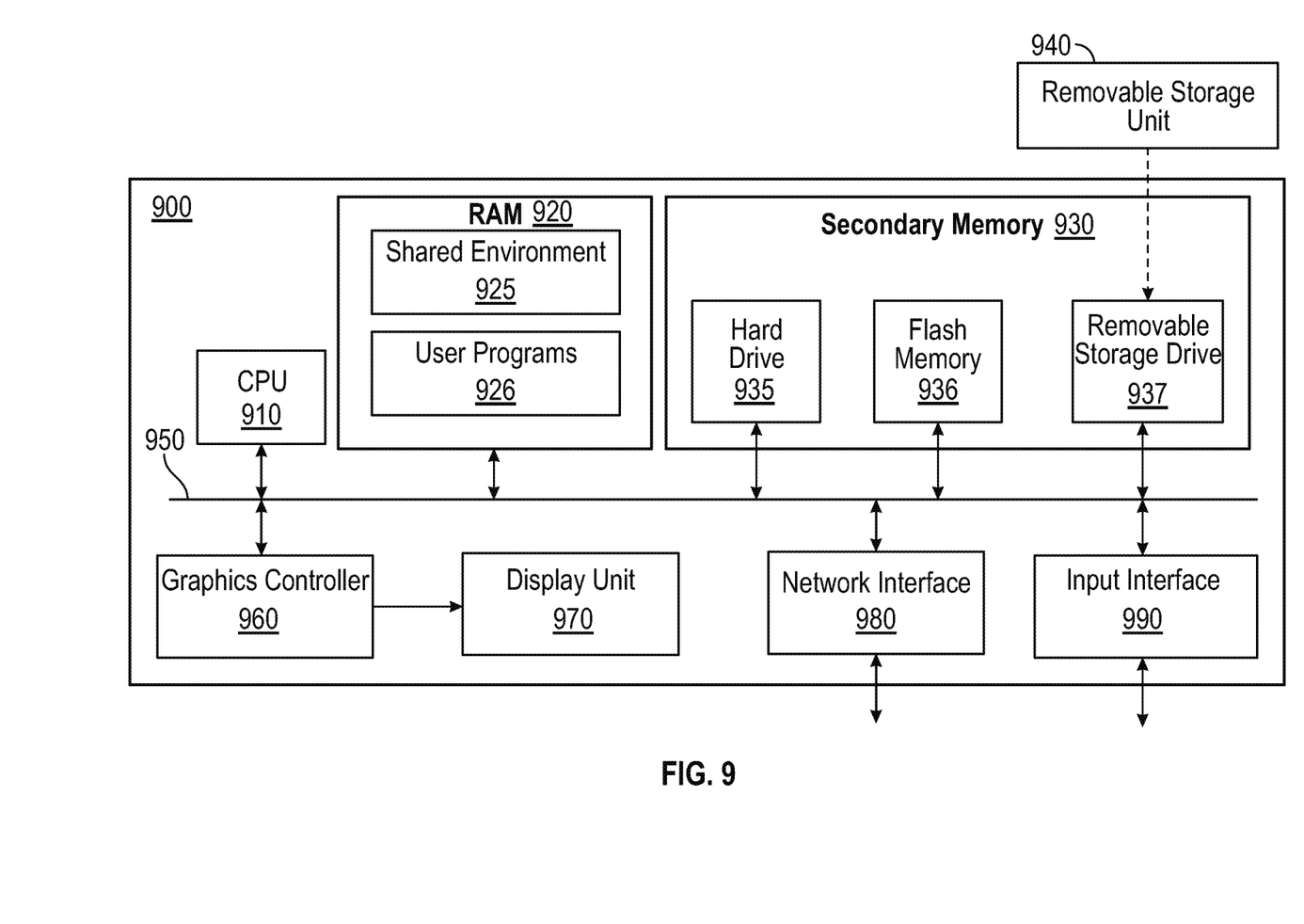
FIG. 9 is a block diagram illustrating the details of a digital processing system in which various aspects of the present disclosure are operative by execution of appropriate software instructions.

Referring to FIG. 9, FIG. 9 is a block diagram 900 illustrating the details of a digital processing system 900 in which various aspects of the present disclosure are operative by execution of appropriate software instructions. The Digital processing system 900 may correspond to the computing device 104 (or any other system in which the various features disclosed above can be implemented).

Digital processing system 900 may contain one or more processors such as a central processing unit (CPU) 910, random access memory (RAM) 920, secondary memory 930, graphics controller 960, display unit 970, network interface 980, and input interface 990. All the components except display unit 970 may communicate with each other over communication path 950, which may contain several buses as is well known in the relevant arts. The components of FIG. 9 are described below in further detail.

CPU 910 may execute instructions stored in RAM 920 to provide several features of the present disclosure. CPU 910 may contain multiple processing units, with each processing unit potentially being designed for a specific task. Alternatively, CPU 910 may contain only a single general-purpose processing unit.

RAM 920 may receive instructions from secondary memory 930 using communication path 950. RAM 920 is shown currently containing software instructions, such as those used in threads and stacks, constituting shared environment 925 and/or user programs 926. Shared environment 925 includes operating systems, device drivers, virtual machines, etc., which provide a (common) run time environment for execution of user programs 926.

Graphics controller 960 generates display signals (e.g., in RGB format) to display unit 970 based on data/instructions received from CPU 910. Display unit 970 contains a display screen to display the images defined by the display signals. Input interface 990 may correspond to a keyboard and a pointing device (e.g., touch-pad, mouse) and may be used to provide inputs. Network interface 980 provides connectivity to a network (e.g., using Internet Protocol), and may be used to communicate with other systems (such as those shown in FIG. 1) connected to the network 106.

Secondary memory 930 may contain hard drive 935, flash memory 936, and removable storage drive 937. Secondary memory 930 may store the data software instructions (e.g., for performing the actions noted above with respect to the Figures), which enable digital processing system 900 to provide several features in accordance with the present disclosure.

Some or all of the data and instructions may be provided on removable storage unit 940, and the data and instructions may be read and provided by removable storage drive 937 to CPU 910. Floppy drive, magnetic tape drive, CD-ROM drive, DVD Drive, Flash memory, removable memory chip (PCMCIA Card, EEPROM) are examples of such removable storage drive 937.

Removable storage unit 940 may be implemented using medium and storage format compatible with removable storage drive 937 such that removable storage drive 937 can read the data and instructions. Thus, removable storage unit 940 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 940 or hard disk installed in hard drive 935. These computer program products are means for providing software to digital processing system 900. CPU 910 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 930. Volatile media includes dynamic memory, such as RAM 930. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 950. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

Although the present disclosure has been described in terms of certain preferred embodiments and illustrations thereof, other embodiments and modifications to preferred embodiments may be possible that are within the principles and spirit of the invention. The above descriptions and figures are therefore to be regarded as illustrative and not restrictive.

Thus the scope of the present disclosure is defined by the appended claims and includes both combinations and sub-combinations of the various features described hereinabove as well as variations and modifications thereof, which would occur to persons skilled in the art upon reading the foregoing description.

I claim:

1. A system for suggesting and generating accountability of assets, comprising:
　at least one computing device (104) configured to establish two-way wireless-communications with an accountability of asset suggesting and generating system (102) over a network (106), wherein the accountability of asset suggesting and generating system (102) comprising:
　at least one asset management module (108) comprising computer-executable instructions, that when executed, instruct the at least one computing device (104) to initiate a work order, at least one end user initiates and submits the work order to the at least one asset management module (108) via the at least one computing device (104), the at least one asset management module (108) comprising a plurality of aspects associated with a plurality of assets, the at least one asset management module (108) comprising at least one intelligent module (206), whereby the at least one intelligent module (206) comprises an analysis module (212) configured to perform the work order segmentation and perform an outline analysis in a remote scenario based on at least one accountability engine (110) analyzes environment, parameters, and measures under which asset has produced predetermined units; and
　the at least one accountability engine (110) configured to process the plurality of aspects associated with the plurality of assets received from the at least one asset management module (108) based on the initiated work order, the at least one accountability engine (110) configured to capture the plurality of assets from the at least one asset management module (108), the at least one accountability engine (110) comprises at least one aspect aggregator module (302) configured to automatically or periodically pull the plurality of assets into the at least one accountability engine (110) from the at least one asset management module (108), the at least one accountability engine (110) comprises at least one processor (304) configured to take the plurality of aspects gathered by the at least one aspect aggregator module (302) and create a plurality of rankings or ratings for the plurality of assets based on the plurality of aspects of the plurality of assets, the plurality of aspects comprise an asset to aspect rating, as the asset to aspect rating under the influence of the plurality of assets, the at least one accountability engine (110) configured to segregate the plurality of assets into a plurality of valid assets and a plurality of invalid assets based on the work order assigned to the at least one asset management module (108) by the at least one end user via the at least one computing device (104) and created plurality of rankings or ratings for the plurality of assets based on the plurality of aspects of the plurality of assets, the at least one accountability engine (110) configured to suggest appropriate assets to the at least one intelligent module (206) in the at least one asset management module (108).

2. The system of 1, wherein the at least one asset management module (108) comprising an allocation module (208) configured to allocate the plurality of assets to the at least one accountability engine (110).

3. The system of 1, wherein the at least one processor (304) communicates with at least one influence factor formulation module (306) to learn about the rating or ranking of the asset in the context of other plurality of assets by taking the plurality of aspects from the at least one aspect aggregator module 302.

4. The system of 1, wherein the at least one processor (304) configured to process the plurality of aspects associated with the plurality of assets, create gradings for each aspect of an asset and segregates the plurality of assets into the plurality of valid assets and the plurality of invalid assets and transfers the plurality of valid assets to a trust engine (112).

5. The system of 4, wherein the at least one processor (304) configured to transfer the plurality of valid assets and the plurality of invalid assets into at least one validated database (312) and at least one invalidated database (314).

6. The system of 1, wherein the at least one processor (304) configured provide an update to the trust engine (112) after processing the plurality of assets and comparing the plurality assets with the existing assets.

7. The system of 1, wherein the at least one accountability engine (110) comprising at least one decision-making module (308) configured to find the plurality aspects associated with the plurality of assets from the combination of the at least one validated database (312) and the at least one invalidated database (314) when the at least one trust engine (112) doesn't fetch the plurality of aspects associated with the plurality of assets.

8. A method for suggesting and generating accountability of assets, comprising:
　assigning a work order to an asset management module (108) by an end user via a computing device (104), whereby the asset management module (108) comprising a plurality of aspects associated with a plurality of assets;
　capturing the plurality of aspects associated with the plurality of assets by an accountability engine (110) from the asset management module (108) and processing the captured plurality of aspects associated with the plurality of assets and automatically or periodically pulling the plurality of assets into the accountability engine (110) from the asset management module (108) by an aspect aggregator module (302), the accountability engine (110) comprises a processor (304) configured to take the plurality of aspects gathered by the aspect aggregator module (302) and creating a plurality of rankings or ratings for the plurality of assets based on the plurality of aspects of the plurality of assets, the plurality of aspects comprise an asset to aspect rating, as the asset to aspect rating under the influence of the plurality of assets;

segregating the plurality of assets into a plurality of valid assets and a plurality of invalid assets based on the work order assigned to the asset management module (108) by the end user via the computing device (104) and created plurality of rankings or ratings for the plurality of assets, and transferring the plurality of valid assets into a trust engine (112) by the accountability engine (110), whereby the plurality of valid assets and the plurality of invalid assets stored in a validated database (312) and an invalidated database (314) by the accountability engine (110);

providing updates to the trust engine (112) after processing the plurality of assets and comparing the plurality of assets with existing assets by the accountability engine (110);

suggesting the plurality of assets by the accountability engine (110) to the asset management module (108) to complete the work order; and assigning the plurality of assets to the work order by the asset management module 108 based on the suggestions and the plurality of ratings or rankings by the accountability engine (110).

9. The method of 8, further comprising a step of finding the plurality of valid assets from the combination of validated and invalidated databases (312-314) and providing the plurality of assets by a decision-making module (308) when the trust engine (112) doesn't provide the plurality of valid assets.

10. The method of 8, further comprising a step of allowing the end user to provide a plurality of inputs and a plurality of desired outputs by a query engine (310).

11. The method of 8, further comprising a step of interacting the query engine (310) with the trust engine (112) and the decision-making module (308) to provide the appropriate plurality of assets.

12. The method of 8, further comprising a step of influencing the plurality of assets by the plurality of other aspects associated with other assets.

13. The method of 8, further comprising a step of pulling the plurality of assets into the accountability engine (110) by an aspect aggregator module (302) from the asset management module (108).

14. A computer program product comprising a non-transitory computer-readable medium having a computer-readable program code embodied therein to be executed by one or more processors, the program code including instructions to:

assign a work order to an asset management module (108) by an end user via a computing device (104), whereby the asset management module (108) comprising a plurality of aspects associated with a plurality of assets;

capture the plurality of aspects associated with the plurality of assets by an accountability engine (110) from the asset management module (108) and process the captured plurality of aspects associated with the plurality of assets and, automatically or periodically pulls the plurality of assets into the accountability engine (110) from the asset management module (108) by an aspect aggregator module (302), the accountability engine (110) comprises a processor (304) configured to take the plurality of aspects gathered by the aspect aggregator module (302) and creating a plurality of rankings or ratings for the plurality of assets based on the plurality of aspects of the plurality of assets, the plurality of aspects comprise an asset to aspect rating, as the asset to aspect rating under the influence of the plurality of assets;

segregate the plurality of assets into a plurality of valid assets and a plurality of invalid assets based on the work order assigned to the asset management module (108) by the end user via the computing device (104) and created plurality of rankings or ratings for the plurality of assets and transfer the plurality of valid assets into a trust engine (112) by the accountability engine (110), whereby the plurality of valid assets and the plurality of invalid assets stored in a validated database (312) and an invalidated database (314) by the accountability engine (110);

provide updates to the trust engine (112) after processing the plurality of assets and comparing the plurality of assets with the existing assets by the accountability engine (110);

suggest the plurality of assets by the accountability engine (110) to the asset management module (108) to complete the work order; and assign the plurality of assets to the work order by the asset management module (108) based on the suggestions and the plurality of ratings or rankings by the accountability engine (110).

* * * * *